Jan. 5, 1954  A. KANTROWITZ  2,665,058
CONSTRUCTION FOR CONTROLLING CLEARANCE AND
POSITIONS OF PARTS BY THERMAL ACTUATORS
Filed June 1, 1950  2 Sheets-Sheet 1
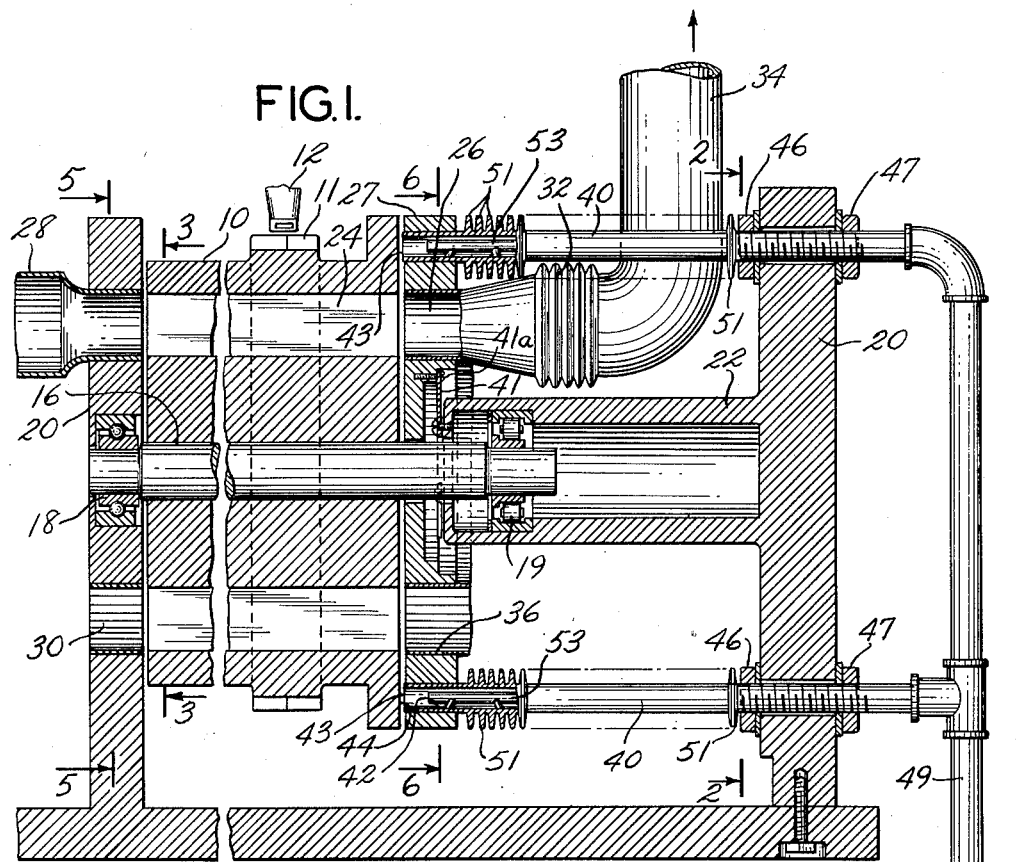
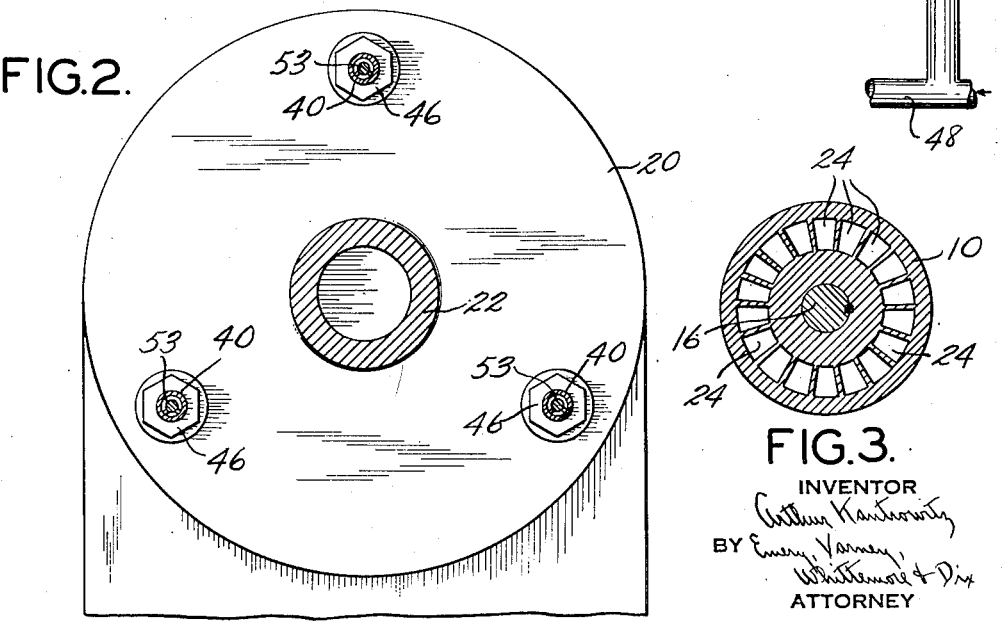
INVENTOR
Arthur Kantrowitz
BY Emery Varney,
Whittemore & Dix
ATTORNEY

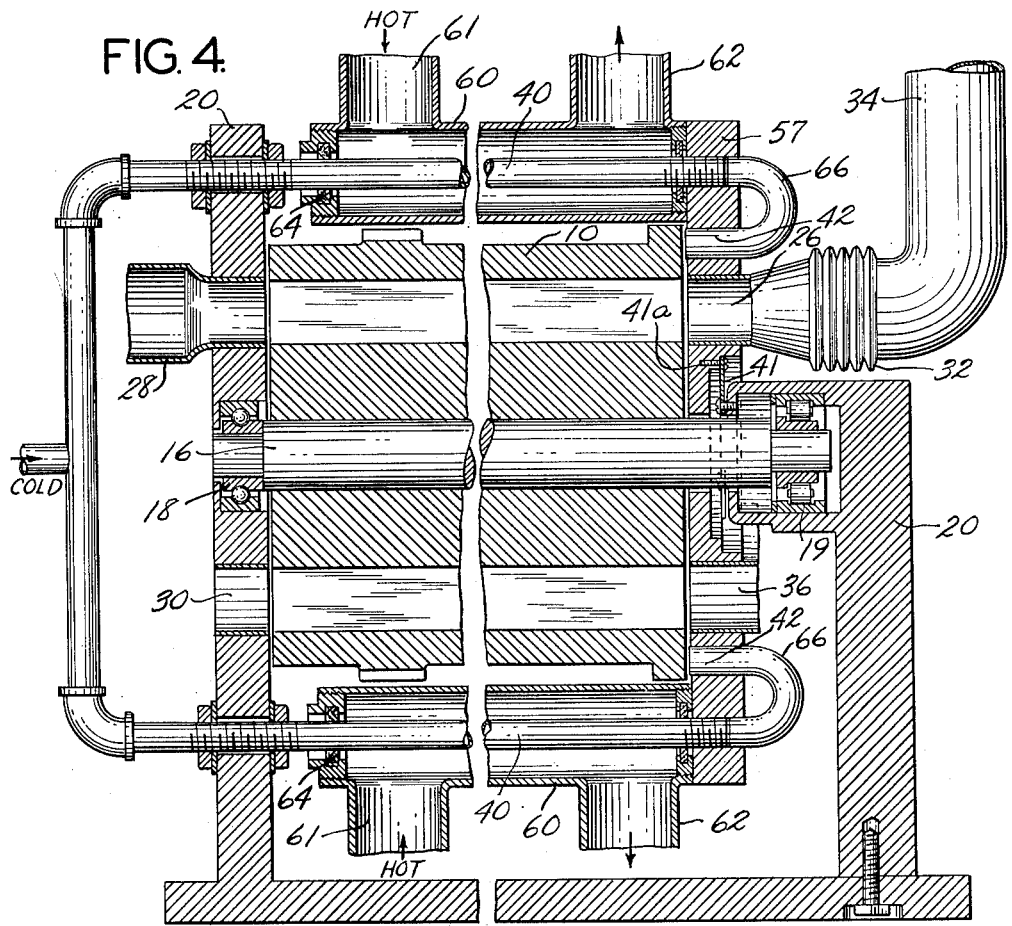
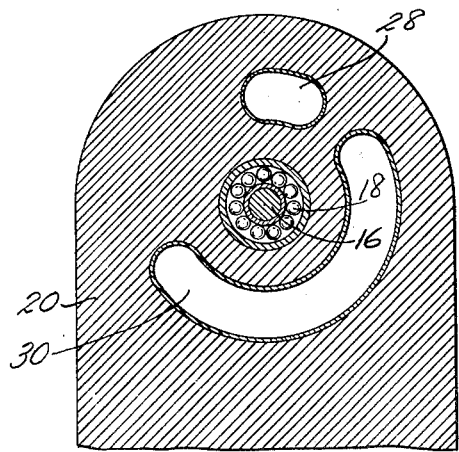
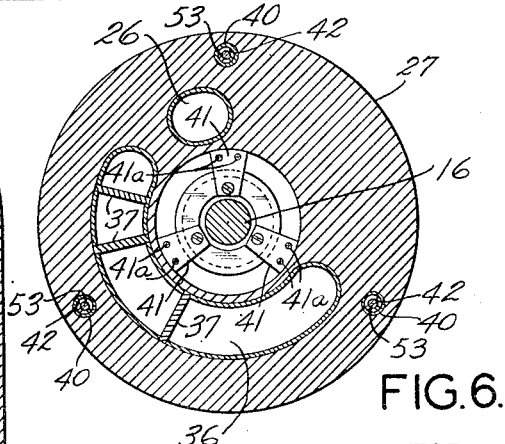

Patented Jan. 5, 1954

2,665,058

UNITED STATES PATENT OFFICE 2,665,058

CONSTRUCTION FOR CONTROLLING CLEARANCE AND POSITIONS OF PARTS BY THERMAL ACTUATORS

Arthur Kantrowitz, Ithaca, N. Y.

Application June 1, 1950, Serial No. 166,752

22 Claims. (Cl. 230—202)

This invention relates to apparatus for controlling the clearance between relatively movable parts. The invention is more especially concerned with rotary machinery in which the principle of operation depends upon the motion of gas-dynamic pressure waves in the channels that contain them. Such machinery has a rotor with passages therein that are periodically brought into register with passages in a stator, and a control of the clearances between the rotor and the stator, with changes in the relationship of the parts of the apparatus, is essential to the efficient operation of such machinery.

One object of the invention is to provide such improved rotary gas-dynamic pressure wave machinery in which the clearance between the rotor and stator changes automatically to accommodate itself to changes in the dimensions of the machinery resulting from temperature changes and other causes.

Another object is to hold a stator with a gas passage adjacent to an end face of a rotor which has passages that periodically register with the stator passages, and to maintain the stator in a desired relation to the rotor by means of thermal actuators that are heated and/or cooled by fluid supplied to the actuators at a rate of flow dependent upon the relative positions of the parts.

In the preferred embodiment of the invention, the stator is supported by thermal actuators comprising tubes that are heated or cooled by fluid flowing through them and an obstruction on the rotor at a controlled clearance from the ends of the tubes constricts the flow of fluid through the tubes and thereby causes the actuators to move in accordance with the clearance that is to be controlled.

Another object of the invention is to hold one of the relatively movable and closely spaced parallel elements in position by means of a plurality of thermal actuators that are angularly spaced around an axis of rotation of one element, and that operate independently of one another in response to changes in the clearance between the elements to maintain a controlled clearance at the angularly spaced regions and thus maintain the elements parallel.

Other objects, features and advantages of the invention will appear or be pointed out as the specification proceeds.

In the drawing, forming a part hereof, in which like reference characters indicate corresponding parts in all the views, Fig. 1 is a diagrammatic view, mostly in section, showing gas-dynamic pressure wave machinery embodying this invention, Fig. 2 is a sectional view taken on the line 2—2 of Fig. 1, Fig. 3 is a reduced scale, sectional view taken on the line 3—3 of Fig. 1, Fig. 4 is a view similar to Fig. 1 but showing a modified form of the invention, Figs. 5 and 6 are diagrammatic, sectional views taken on the lines 5—5 and 6—6 respectively, of Fig. 1 and showing the locations of the valve ports.

The rotary machinery illustrated in Fig. 1 is an apparatus for compressing air by means of the motion of pressure waves in the passages of a rotor. Similar apparatus having the rotor passages at an angle, can be used as a motor. The invention will be described in connection with a gas-dynamic pressure wave compressor, but it will be understood that it is equally applicable to motors and to any other apparatus or machinery in which it is desirable to control the clearance between movable elements by thermal actuators.

In the machinery illustrated, a rotor 10 has blades 11 around its periphery, and the rotor is driven by an air blast from a nozzle 12 that directs the air against the blades 11. The rotor 10 has a shaft 16 that turns in bearings 18 and 19.

The bearing 18 is held in a fixed frame 20 and is of such construction that it serves to take both radial loading and longitudinal thrust. The bearing 19 is a roller bearing for radial loading and is so correlated with the shaft 16 that it permits longitudinal movement of the shaft to accommodate thermal expansion and contraction that change the length of the shaft. The bearing 19 is supported from the right-hand portion of the fixed frame 20 by a bracket 22 extending inward from the right-hand end of the frame.

There are gas passages 24 extending through the rotor 10 and opening through the opposite ends of the rotor. These passages 24 move into register with a primary passage 26 opening through the face of an adjustable stator or relatively fixed element 27 located at the right-hand end of the rotor 10. The passages 24 of the rotor also move into and out of register with a gas supply passage 28 that opens through the left-hand portion of the fixed frame 20.

The passages 26 and 28 are of the same height as the passage 24 of the rotor but of somewhat greater angular extent as shown in Figs. 5 and 6. The hot gas for supplying the compression power is supplied to the rotor through the passage 28. There is another passage 30 through the left-hand side of the fixed frame 20, and this passage 30 is of wide angular extent so that each rotor passage 24 remains in communication with the passage 30 for a substantial period of time and a number of the passages 24 are opposite various portions of the passage 30 at the same time.

As each of the passages 24 moves into position opposite the inlet passage 28, a puff of gas under pressure comes into the passage 24 and creates a pressure wave that travels along the passage 24 compressing the air ahead of it.

As the rotor 10 continues to rotate, the passage 24 in which the air is being compressed comes into register with the compressed air outlet passage 26 in the adjustable stator 27, and the compressed air passes into the passage 26 and through an expansion joint 32, into an outlet pipe 34. Before the hot gas behind the compressed air reaches the right-hand end of each rotor passage 24, the rotor passage moves beyond the outlet passage 26 and into position to let the hot gas escape through an exhaust outlet 33 which is of substantial axial extent so that each rotor passage remains in communication with this exhaust outlet 36 for a substantial period of time and a large number of rotor passages 24 are in communication with the exhaust outlet 36 at the same time. The aero-dynamic wave machinery is illustrated diagrammatically in the drawing and the above description of the operation of the apparatus is sufficient for a complete understanding of this invention. Such aero-dynamic wave machinery is well known and is more fully described in the Seippel Patent 2,399,394, issued April 30, 1946.

The exhaust outlet 36 is divided by partitions 37 (Fig. 6) into two or more passages which eventually come together so that the high energy exhaust gas issuing in the portion of the outlet 36 nearest to the outlet passage 26 (Fig. 1) can be used to aspirate the remainder of the exhaust gases, thus aiding in the scavenging of the passages in the rotor. This draws in fresh air through the port 30 at the other end of the rotor, and the apparatus is then ready to repeat its cycle during the next revolution of the rotor.

It will be apparent that the successful operation of the compressor depends upon the maintaining of close clearances between the end face of the rotor 24 and the confronting faces of the fixed frame 20 and the adjustable stator 27. In the drawings, the clearance at the opposite ends of the rotor are greatly exaggerated for clearer illustration.

By having the left-hand end of the rotor shaft 16 held in the thrust bearing 18 in a portion of the fixed frame 20 that is immediately adjacent to the left-hand end of the rotor 10, the clearance between the left-hand end face of the rotor 10 and the confronting face of the fixed frame 20 can be maintained because thermal expansion and contraction of the rotor and its shaft in this very short distance from the thrust bearing produce substantially no change of position of the left-hand end of the rotor.

When control of the clearance at the left-hand end of the rotor is desired, a construction similar to that for controlling the clearance on the right-hand side of the apparatus can be used.

The adjustable stator 27 is provided with thermal actuators for moving it axially to accomodate changes in its clearance from the rotor 10, and thus to maintain a substantially constant clearance between the right-hand end of the rotor 10 and the confronting face of the adjustable stator 27.

In the construction illustrated in Fig. 1, the adjustable stator 27 is supported from the right-hand end of the fixed frame 20 by tubes 40, located at angularly spaced regions around the adjustable stator 27. Three tubes are shown at 120° spacing and it is desirable to have at least three tubes in order to obtain a better control of the parallelism of the adjustable stator 27 with respect to the end face of the rotor 10 in addition to the control of the clearance. More than three tubes 40 can be used, but are ordinarily not necessary. The stator 27 is also supported by the plates 41 which have their outer ends connected to the stator by screws 41a, and their inner ends connected to the bracket 22 by other screws 41a. There are three or more plates 41, as best shown in Fig. 6. The plates 41 provide a radial rigidity but have sufficient flexibility to permit the stator to move axially or to shift its plane angularly, within a limited degree, with respect to the axis of rotation of the rotor. This permits adjustment to maintain parallelism of the confronting faces of the rotor and the stator.

The thermal actuators need not be located at the parts whose relative movement they control and need not be directly connected mechanically to the parts. Remote location and interposition of mechanical linkages or other motion transmitting connections can be used to obtain mechanical advantages or to obtain more advantageous location of the thermal actuators.

The left hand ends of the tubes 40 are rigidly secured to the adjustable stator 27 and they extend into and communicate with secondary gas passages 42 that open through the face of the adjustable stator opposite and adjacent to an annular face 44 of the rotor. This face 44 is spaced from the ends of the passages 42, but the clearance is close so that the face 44 comprises an obstruction limiting the flow of gas from the tubes 40 and passages 42.

There are lips 43 around the ends of the passages 42. These lips are ends of the tubes 40 projecting slightly beyond the face of the stator 27, but they may be formed as protuberances on the face of the stator 27, if the construction is one in which the tubes 40 do not extend all the way through the passages 42. These lips, which may be of the order of two-thousandths of an inch in height, are for the purpose of making the clearance between the rotor and the stator smallest at the ends of the passages 42 and they insure that the clearance between the passages 42 and the rotor will decrease to zero before any other parts of the rotor or stator come into contact with one another. The height of the lips 43 can be less with accurately-machined faces than with cruder machining where there are more high points on the faces.

The clearance between the ends of the passages 42 and the annular face 44 of the rotor is somewhat less than the clearance between the ends of the passage 26 and the right-hand ends of the rotor passages 24 because of the lips 43 formed by projection of the tubes 40 beyond the face of the stator. It is a feature of the invention, however, that the clearance between the ends of the passages 42 and the rotor face 44 vary with any changes in the clearance between the end of the passage 26 and the confronting face of the rotor through which the passages 24 open.

The right-hand ends of the tubes 40 extend through openings in the fixed frame 20 and are held in position by clamping nuts 46 and 47 located on opposite sides of the section of the frame 20 through which the tubes 40 extend. The tubes 40 are free to slide in the openings through the frame 20, and it is thus possible to adjust these tubes 40 longitudinally with respect to the frame 20 by turning the nuts 46 and 47. These nuts 46 and 47 are used to adjust the length of each of the tubes 40 between the stator 27 and the right-hand section of the frame 20 when obtaining the initial parallelism and clearance between the stator 27 and the confronting face of the rotor 10. After obtaining this initial adjustment, the operation of the clearance control is automatic and the nuts 46 and 47 are not adjusted again unless, or until, the apparatus is taken apart for repairs.

Hot gas is supplied to the tubes 40 from a source 48 communicating with the tubes 40 through piping 49. When there is a substantial flow of hot gas through the tubes 40, the tubes become heated and expand, thus increasing their length between the adjustable stator 27 and the right-hand section of the frame 20 to which the tubes 40 are connected. This moves the adjustable stator toward the rotor 10 and reduces the clearance between the stator and the rotor. The reduction in the clearance offers an increased obstruction to the flow of gas through the tubes 40 and the reduced flow of gases results in the supply of less heat to the tubes so that the temperature of the tubes is reduced by the air surrounding them, and the tubes contract so that the clearance is increased. In this way an optimum clearance can be maintained automatically. The tubes 40 are thermal actuators for shifting the adjustable stator 27 axially to control its clearance from the rotor. The tubes 40 are merely representative of thermal actuators. Bimetallic and liquid-filled, and other thermal actuators are well-known in the art. For purposes of this invention a thermal actuator is to be considered any device utilizing the expansion and contraction of matter under the influence of temperature changes for producing a limited motion.

In order to make these thermal actuators respond more quickly, the tubes 40 are preferably made with thin walls and they are provided with fins 51 for dissipating heat to the surrounding air. Shields can be used to protect the thermal actuators in Fig. 1 from undesired thermal effects caused by the proximity of other parts, such as the pipe 34, which carries heated air. Another expedient for making the thermal actuators more sensitive is the provision of a filler 53 in the center part of the cross-section of each of the pipes 40. These fillers confine the gas flow to the regions of the tube that are closest to the tube walls, and for any given velocity of flow, the temperature of the gas passing through a tube containing the filler 53 is reduced more than if the entire cross-section of the tube were carrying the gas stream. In the preferred construction, the tubes 40 are made of stainless steel 18—8. This metal has the advantage of a high coefficient of thermal expansion and low heat conductivity. The low conductivity reduces the losses of heat from the ends of the tubes where they are connected with the stator and frame.

It will be evident that if the adjustable stator 27 gets out of parallelism with the confronting face of the rotor, one of the tubes 40 will have a greater clearance from the rotor than do the other tubes; and the gas flow through this particular tube will be higher than that in the other tubes. This increased gas flow causes a greater expansion of the particular tube and restores the adjustable stator to a position parallel with the confronting face of the rotor. Another advantage of the combination shown in Figure 1 is that a failure in the gas supply from the source 28 will result in an increase in the clearance which will reduce the efficiency of operation but cannot cause any possible damage to the machinery. Having the clearance become excessive in the event of failure of the operating mechanism is a safety measure as compared with a construction in which the clearance becomes excessively small in the event that the automatic control fails.

Fig. 4 shows a modified form of the invention in which the thermal actuators are located around the periphery of the rotor instead of beyond the rotor as in Fig. 1. This construction shown in Fig. 4 has the advantage of being more compact longitudinally. Corresponding parts are designated by the same reference characters as in Fig. 1.

The stator in Fig. 4 is indicated by reference character 57. The principal difference is that the adjustable stator 57 is connected with the left-hand section of the frame 20 by the tubes 40. As a result of this difference, contraction of the tubes 40 reduces the clearance between the adjustable stator 57 and the confronting face of the rotor 10; whereas expansion of the tubes 40 increases the clearance. This operation is the opposite of that obtained with the structure illustrated in Fig. 1.

Another difference in the structure shown in Fig. 4 is that the tubes 40 are surrounded by jackets 60. Each of these jackets has an inlet passage 61 for the entrance of fluid into the jacket and an exhaust passage 62 for the flow of fluid from the jacket. The jackets 60 cannot be connected with both the frame 20 and the adjustable stator 57 because this would interfere with the movement of the stator by the tubes 40. In the preferred construction each jacket 60 is connected to the adjustable stator 57 at one end and left free to slide on the tube 40 at the other end. A packing gland or other seal 64 surrounds the tube 40 and prevents the escape of fluid from the jacket along the outside surface of the tube 40.

The tubes 40 together with their jackets 60 comprise the thermal actuators in Fig. 4. In the operation of these thermal actuators, a gas is passed through the tube 40 and a fluid of different temperature is passed through the jacket 60. The tube 40 is thus subjected to different temperature influences on its inside and outside surfaces and the expansion and contraction of the tube 40 depend upon which of the temperature influences predominates. The flow of fluid through the jacket 60 can be controlled by the operator of the machine, but is constant after being manually adjusted. It is the flow of gas through the tube 40 that varies in accordance with the change in the clearance between the rotor and the adjustable stator 57.

The ends of the tubes 40 communicate with the openings 42 in the adjustable stator 57 through U tubes 66. In the preferred operation of the thermal actuators of Fig. 4, relatively cold gas, such as atmospheric air, is blown through the tubes 40, and hot gas is circulated through the jackets 60. As clearance decreases, the rate of flow of the relatively cold gas is obstructed and the temperature of the tubes 40 increases because of their reduced internal cooling. This causes the tubes 40 to increase in length, with resulting increase in the clearance of the rotor 10 and the adjustable stator 57. Conversely, an increase in the clearance causes greater flow of the relatively cold gas with increased cooling of the tubes 40 and resulting contraction of the tubes.

Other expedients for applying heat to the outside surfaces of the tubes 40 in Fig. 4 can be used, such as electric heating coils, or tubes that are open to the radiation of heat from the surface of the rotor.

The preferred embodiments of the invention have been illustrated and described, but changes and modifications can be made and some features of the invention can be used alone or in different combinations without departing from the invention as defined in the claims.

What is claimed is:

1. Motive apparatus including a stator element, a rotor element that turns about an axis, a primary conduit in each of the elements, the conduit in each element having an end that communicates with the conduit in the other element when the rotor element is in a predetermined angular position about its axis, end faces of the conduits parallel and adjacent to one another but having a clearance between them when the conduits are in communicating positions, and automatic control means for regulating said clearance in accordance with changes in the dimensions of the parts, said control means comprising a secondary conduit connected at one end to one of said elements and in a fixed relation to the end of the primary conduit in that element which communicates with the other primary conduit, an obstruction located in a position that is adjacent to an outlet end of the secondary conduit and spaced from the secondary conduit by a clearance that extends in a direction having at least a component normal to the planes of the end faces of said primary conduits, and that leaves a restricted outlet for the flow of gas from the secondary conduit, said obstruction being in a fixed relation to the end face of said other conduit so that the clearance between the secondary conduit and the obstruction is proportional to the clearance between the end faces of the primary conduits, a supply line for supplying gas to an inlet end of the secondary conduit, from a source of gas at a different temperature than the medium surrounding the secondary conduit, a fixed support to which the secondary conduit is connected remote from its outlet end, a connection between the outlet end portion of the secondary conduit and the end of the primary stator conduit for moving the end face of the primary stator conduit with changes in the length of the secondary conduit, said secondary conduit extending in a direction to increase and decrease its clearance from said obstruction and the clearance between the end faces of the primary conduits upon thermal expansion and contraction of said secondary conduit.

2. Motive apparatus including a stator element, a rotor element that turns about an axis, confronting faces on the stator and rotor elements extending substantially normal to the axis of rotation, primary conduits in both the stator and the rotor in position to register with one another when the rotor is at certain phase angles, the ends of said conduits being close to one another but having a clearance between them, automatic apparatus for regulating the extent of said clearance including a group of secondary conduits extending through the stator and close to an annular face of the rotor that obstructs the flow of a gas from the secondary conduits, the obstruction being proportional to the clearance between the rotor and the secondary conduits, a fixed frame to which the secondary conduits are connected remote from the rotor, so that thermal expansion and contraction of the secondary conduits moves the stator element with respect to the fixed frame to shift the face of the stator toward and from the confronting face of the rotor and thereby control the clearance.

3. Motive apparatus comprising a rotor that turns about an axis which extends through opposite ends of the rotor, said rotor having primary passages therein that open through ends of the rotor, a stator having primary passages therein in position to register with the passages in the rotor when the rotor is at certain phase angles during its rotation about its axis, the rotor having an annular face normal to the axis of rotation of the rotor and generally symmetrical about said axis, a fixed frame, a plurality of tubes connected between the stator and the fixed frame for holding the stator in a limited clearance position with respect to the rotor, the stator having passages opening through it for the escape of gas from said tubes, the ends of said passages being located close to said annular face of the rotor so that the amount of clearance between the annular face and the ends of the tubes determines the resistance to the escape of gas from said passages, and means for supplying a flow of gas through the tubes with the gas at a different temperature from the medium that is in contact with the other sides of the tube walls so that thermal expansion and contraction of the tubes depends upon the relative amount of fluid passing through the tubes, the tubes extending from the fixed frame to the stator in directions to produce a decrease in the clearance between the rotor and the stator when the length of the tubes is changed by a preponderance of the temperature influences to which the inside walls of the tubes are subjected.

4. The motive apparatus described in claim 3 with means through which a flow of hot gas is supplied to the inside of the tubes, and in which there are means on the outside of the tubes for cooling the tubes.

5. Motive apparatus including a stator having a bounding surface shaped as a surface of revolution with primary and secondary conduits opening therethrough, a rotor that turns about an axis substantially coincident with that of the surface of revolution of the stator and that has a surface confronting the surface of the stator with primary passages in position to register with the primary passages of the stator when the rotor is in predetermined phase angle positions, said rotor also having an annular face that confronts the open ends of the secondary conduits and that obstructs gas flow from the secondary conduits in accordance with the clearance between the rotor and the stator, a fixed frame, tubes connecting the stator with the fixed frame and communicating with the secondary conduits that open through the stator, and means subjecting the interior and exterior surfaces of the tubes to influences that vary their temperature in opposite directions, the tubes extending from the fixed frame to the stator in directions to produce a decrease in the clearance between the rotor and the stator when the length of the tubes is changed by a preponderance of the temperature influences to which the inside walls of the tubes are subjected.

6. Motive apparatus comprising a first element, a second element with respect to which the first element moves, said elements being adjacent to one another with a limited clearance between them, a thermal actuator connected with one of the elements and which moves that element toward and from the other to control the extent of said clearance, means extending to a position adjacent to the thermal actuator and that supplies a flow of fluid at a predetermined temperature in thermal contact with said thermal actuator, and an automatic regulator for the fluid flow operatively connected with at least one of said elements and controlled by relative movement of the elements in directions that change the clearance between said elements.

7. Motive apparatus comprising a first element and a second element adjacent to one another with a limited clearance between them, the first element being movable with respect to the second element to change the clearance between said elements, a thermal actuator that moves one of the elements toward and from the other to control the extent of said clearance, means having a passage through which fluid flows, the actuator being in thermal contact with said means so that fluid flow through the passage can change the temperature of the actuator, an obstruction connected to the second element and located at one end of the passage and spaced from an outlet end of the passage by a clearance that is dependent upon said limited clearance between the elements and that varies in proportion to said limited clearance as the first element moves with respect to the second element, and a supply source from which fluid at controlled temperature is forced into one end of the actuator passage and discharged at the other end through the clearance between said obstruction and the outlet end of the passage, and the thermal actuator extending in directions to reduce the clearance in response to changes in temperature caused by said fluid.

8. Motive apparatus comprising two elements having confronting surfaces parallel to one another and spaced from one another by a limited clearance, one of said elements being movable with respect to the other in a direction normal to said confronting surfaces to change the limited clearance, a plurality of thermal actuators connected with one of said elements and operable to maintain their connected element parallel with and at a controlled clearance from the other element, and means for controlling the temperatures of the respective thermal actuators, the apparatus having a plurality of gas passages at locations where changes in the parallelism and clearance between said elements change the cross sections of at least some of said passages.

9. Motive apparatus comprising two elements having confronting surfaces that are substantially parallel to one another and spaced from one another by a limited clearance, one of said elements being movable with respect to the other in the direction parallel to said confronting surfaces, a plurality of thermal actuators connected with one of said elements at a number of spaced locations, said thermal actuators having passages therein that terminate adjacent to a surface of the other element so that the space for the escape of gas from said passages depends upon the clearance between the elements, and means dependent upon said space for controlling the temperature of the respective actuators in directions that reduce the clearance upon increase in said space and resulting increase in the rate of flow so as to maintain the parallelism of the confronting surfaces of said elements.

10. Motive apparatus comprising two elements that have confronting surfaces parallel to one another and spaced from one another by a limited clearance, said elements being movable with respect to one another in a direction normal to the confronting faces, a fixed frame, a plurality of thermal actuators connecting the fixed frame with the first of said elements and operable to vary the clearance between said elements, said thermal actuators having passages opening through them and terminating adjacent to the second of said elements so that clearance between the elements controls the space for the escape of gas from the ends of said passages, and means for supplying a flow of gas to the passages to vary the temperature of the actuators in a direction to reduce the clearance and the rate of flow permitted by the clearance.

11. Rotary machinery comprising two elements, one of which is adjustable toward and from the other, and each of which has a face parallel to a confronting face of the other, the confronting faces being adjacent to one another but spaced apart by a limited clearance, a plurality of thermal actuators holding one of the elements in an adjusted position with respect to the other, a source of fluid at a controlled temperature, the thermal actuators having passages through which fluid from said source enters and leaves the respective actuators to regulate their temperature, obstructions that control the rate of flow of the fluid through the said actuators, the obstructions and thermal actuators being connected with different ones of said elements so that the cross section of the space for flow of fluid past said obstruction depends upon the clearance between the respective actuators and the element toward and from which the other element is adjustable, and the thermal actuators extending in directions to reduce the clearance in response to changes in temperature caused by said fluid.

12. Motive apparatus comprising an adjustable element having a face with passages opening through it, a movable element including a portion that travels across said face and across said passages, a fixed frame supporting a bearing on which the movable element moves a plurality of tubes supporting the adjustable element from the frame, said tubes extending from a portion of the fixed frame toward the movable element and communicating with said passages and being connected with the adjustable element at their ends that are nearest to the movable element, means for adjusting the tubes longitudinally with respect to the fixed frame to control the initial clearance between the adjustable and movable elements, means forming passages through which hot gas is supplied to the tubes and through which the gas flows at rates dependent upon the clearance between the gas outlets in the face of the adjustable element, fillers in the tubes confining the flow of gas to the regions of the tubes adjacent to the tube walls, said walls being of thin section and having faces on their outside surfaces that promote rapid transfer of heat to and from the walls in accordance with the variations in the rate of flow of hot gases through the tubes.

13. Rotary machinery including an adjustable element having a surface of revolution through which passages open, a rotor that turns about an axis substantially coincident with the axis of the surface of revolution of the adjustable element, and that has an annular face extending across the ends of said passages and spaced from said passages by a small clearance, a fixed frame supporting a bearing on which the rotor turns, supports for the adjustable element including tubes extending from the adjustable element to a portion of the fixed frame, said tubes connecting with the openings through the face of the adjustable element, adjusting means for regulating the initial clearance between the adjustable element and the rotor, and means for flowing gas through the tubes at a rate dependent upon the clearance between the rotor and the passages that open through the face of the adjustable element, the tubes extending from the frame to the adjustable element in directions that cause reduction in the clearance as the lengths of the tubes change with the temperature variation produced by the gas flowing in the tubes.

14. The apparatus described in claim 13 with jackets surrounding the tubes, and supply conduits for flowing gases of different temperatures through the tubes and through the jackets, respectively.

15. The apparatus described in claim 13 with jackets surrounding the tubes and fixed with respect to the tubes at one end but slidable at their other ends with respect to the tubes so that the tube can change in length independent of the length of the jacket.

16. Apparatus as described in claim 13 with a jacket surrounding each of the tubes and with means connecting the jackets to the fixed element while the other end of the jacket remains free to move longitudinally with respect to the tube and the fixed frame, and passages for supplying fluid to the jacket at one end and for the escape of fluid at the other end of said jacket.

17. The apparatus described in claim 13 with heating means surrounding the outsides of the tubes, and with means for forcing cool gas through the interiors of the tubes.

18. Motive apparatus including a fixed frame and an adjustable element, a second element movable with respect to both the fixed frame and the adjustable element and having a portion that is located at a controlled clearance from the adjustable element, and one or more thermal actuators operatively connected with the fixed frame and the adjustable element in position to move the adjustable element in directions to increase and decrease the clearance between the adjustable element and the movable element, said thermal actuators having passages therein for the flow of fluid that influences the temperature of the actuators, and said actuators being oriented in positions to decrease the clearance when their temperature is changed by the flow through said passages of the thermal actuators.

19. Motive apparatus including a fixed frame and an adjustable element, a second element movable with respect to both the fixed frame and the adjustable element and having a portion that is located at a controlled clearance from the adjustable element, one or more thermal actuators operatively connected with the fixed frame and the adjustable element in position to control the clearance between the adjustable element and the movable element, said thermal actuators having passages therein for the flow of fluid that influences the temperature of the actuators, and fillers in the passages in position to increase the proportion of the fluid in contact with the walls of the passages.

20. Motive apparatus including two elements, one of which is movable with respect to the other, and both of which have confronting faces spaced from one another by a clearance that is to be controlled, thermal actuators operatively connected to the element with respect to which the other element is movable, passages through the thermal actuators for the flow of fluid, at least a portion of said passages being partially obstructed with the degree of obstruction dependent upon the clearance to be controlled, and means for varying the temperature of the thermal actuators including jackets for fluid surrounding at least a portion of the length of said actuators.

21. Motive apparatus including a fixed frame, an adjustable element located at a controlled position with respect to the fixed frame, a movable element having a portion that is adjacent to and movable with respect to the adjustable element, confronting faces on the adjustable and movable elements at a limited clearance from one another, the adjustable element having passages opening through it at locations opposite to a portion of the confronting face of the movable element, lips protruding from the ends of said passages in a direction toward the confronting face of the movable element to reduce the clearance between the elements at the regions immediately surrounding the passages through the adjustable element, and thermal actuators operatively connected between the fixed frame and the adjustable element for moving the adjustable element with respect to the fixed frame and toward and from the movable element, said thermal actuators having fluid passages therein communicating with the passages through the adjustable element so that the flow of fluid through the thermal actuators is dependent upon the clearance between the adjustable element and movable element, and said actuators being oriented in positions to decrease the clearance when their temperature is changed by the flow of fluid through said passages of the thermal actuators.

22. Motive apparatus including a stator element, a rotor element that turns about an axis, a primary conduit in each of the elements, the conduit in each element having an end that communicates with the conduit in the other element when the rotor element is in a predetermined angular position about its axis, the ends of the conduits being adjacent to one another but having a clearance between them when in communicating positions, and automatic control means for regulating said clearance in accordance with changes in the dimensions of the parts, said control means comprising a thermal actuator that moves one of the elements toward and from the other to control the extent of said clearance, means from which fluid at a predetermined temperature flows in thermal contact with said thermal actuator, and a regulator for the fluid flow controlled by changes in the clearance between said elements, said actuators being oriented in positions to decrease the clearance when their temperature is changed by the flow of fluid through said passages of the thermal actuators.

ARTHUR KANTROWITZ.

References Cited in the file of this patent

UNITED STATES PATENTS

| Number | Name | Date |
|---|---|---|
| 864,183 | Noyes | Aug. 27, 1907 |
| 1,527,910 | Parsons et al. | Feb. 24, 1925 |
| 1,672,529 | Holzworth | June 5, 1928 |
| 2,297,852 | Zetterquist | Oct. 6, 1942 |
| 2,445,661 | Constant et al. | July 20, 1948 |